United States Patent
Brown et al.

(10) Patent No.: US 10,464,453 B2
(45) Date of Patent: Nov. 5, 2019

(54) MOTOR VEHICLE SEAT, IN PARTICULAR A MOTOR VEHICLE REAR SEAT

(71) Applicant: Kiekert AG, Heiligenhaus (DE)

(72) Inventors: Scott Brown, Livonia, MI (US); Andrew Barta, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 102 days.

(21) Appl. No.: 15/708,828

(22) Filed: Sep. 19, 2017

(65) Prior Publication Data

US 2019/0084451 A1   Mar. 21, 2019

(51) Int. Cl.
| | |
|---|---|
| *B60N 2/20* | (2006.01) |
| *B60N 2/876* | (2018.01) |
| *B60N 2/30* | (2006.01) |
| *B60N 2/02* | (2006.01) |
| *B60N 2/874* | (2018.01) |

(52) U.S. Cl.
CPC .......... *B60N 2/3011* (2013.01); *B60N 2/0228* (2013.01); *B60N 2/0232* (2013.01); *B60N 2/20* (2013.01); *B60N 2/3065* (2013.01); *B60N 2/3075* (2013.01); *B60N 2/3077* (2013.01); *B60N 2/3079* (2013.01); *B60N 2/874* (2018.02); *B60N 2/876* (2018.02); *B60N 2002/0272* (2013.01)

(58) Field of Classification Search
CPC ... B60N 2/20; B60N 2/876; B60N 2002/0236
See application file for complete search history.

(56) References Cited

U.S. PATENT DOCUMENTS

| | | | | |
|---|---|---|---|---|
| 7,547,070 | B2 * | 6/2009 | Nathan | B60N 2/206 296/65.17 |
| 2005/0104433 | A1 * | 5/2005 | Ganot | B60N 2/08 297/378.12 |
| 2010/0072772 | A1 * | 3/2010 | Gamache | B60N 2/0232 296/65.08 |
| 2011/0062761 | A1 * | 3/2011 | Seibold | B60N 2/01583 297/378.14 |
| 2014/0191553 | A1 * | 7/2014 | Blendea | B60N 2/929 297/354.1 |
| 2014/0238188 | A1 * | 8/2014 | Ito | B60N 2/0228 74/664 |

(Continued)

FOREIGN PATENT DOCUMENTS

| | | |
|---|---|---|
| WO | 2004/060713 | 7/2004 |
| WO | 2007/030514 | 3/2007 |

OTHER PUBLICATIONS

International Search Report, dated Apr. 3, 2019, issued in counterpart international application No. PCT/IB2018/001066.

*Primary Examiner* — Timothy J Brindley
(74) *Attorney, Agent, or Firm* — Renner, Otto, Boisselle & Sklar, LLP (57) ABSTRACT

A motor vehicle seat includes at least a seat area, a backrest and, if necessary, a headrest as seat elements. The motor vehicle seat includes at least one detachable bolting unit assigned to the seat area and/or the backrest. Furthermore, at least one handle is provided to act on the bolting unit(s). The seat elements can assume several different functional positions. The single handle is arranged to act on at least an electrical drive assigned to the bolting unit(s) and thus to execute all functional positions.

15 Claims, 5 Drawing Sheets

(56) References Cited

U.S. PATENT DOCUMENTS

| | | | |
|---|---|---|---|
| 2014/0265991 A1* | 9/2014 | Zhao | B60N 2/0232 318/626 |
| 2015/0274037 A1* | 10/2015 | Matsufuji | B60N 2/12 297/344.1 |
| 2016/0016493 A1* | 1/2016 | Deppe | B60N 2/0232 297/378.12 |
| 2017/0166089 A1* | 6/2017 | Frye | B60N 2/002 |
| 2017/0190267 A1 | 7/2017 | Hansen et al. | |
| 2017/0197526 A1 | 7/2017 | Salvia, III et al. | |
| 2017/0204949 A1* | 7/2017 | Dunn | B60N 2/2251 |
| 2017/0225592 A1* | 8/2017 | Ferre | B60N 2/0228 |
| 2018/0015849 A1* | 1/2018 | Mahadik | B60N 2/20 |
| 2018/0281632 A1* | 10/2018 | Tindall | B60N 2/20 |

\* cited by examiner

MOTOR VEHICLE SEAT, IN PARTICULAR A MOTOR VEHICLE REAR SEAT

The invention relates to a motor vehicle seat, in particular a motor vehicle rear seat, having as seat elements at least a seat area, a backrest and, if applicable, a headrest, furthermore having at least a detachable bolting unit respectively assigned to the seat area, the backrest and the optional headrest, and having at least a handle to act on at least one of the bolting units, whereby these seat elements can assume several different functional positions, such as "normal position", "intermediate position" and "folded position".

BACKGROUND

Motor vehicle seats are known which can be transferred from a "normal position" into a "folded position". Generally, such motor vehicle seats are rear seats. In the "normal position", such motor vehicle seats serve as seats for a motor vehicle passenger. In the "normal position" the backrest is generally secured to secure the motor vehicle passenger in respect of the seat area and the motor vehicle chassis with the aid of the pertaining bolting unit. In the "folded position" the backrest is regularly folded down onto the seat area. Transferring the optional headrest into a folded in or folded down position can also be done. An increased loading area is thus provided.

In the "folded position", the motor vehicle seat or motor vehicle rear seat can be placed in a recess in the motor vehicle floor, for example as described and depicted in the class-specific state of the art according to US 2017/0190267 A1. Furthermore, there is the possibility of removing the relevant motor vehicle seat completely from the pertaining motor vehicle.

In the aforementioned procedure during transfer into the "folded position" the seat area can initially be transferred into a pushed forward position, as shown in detail in the further state of the art according to US 2017/0197526 A1. The backrest is then subsequently folded down onto the seat area. In this case, too, a bolting unit assigned to the seat area must initially be detached".

In addition, functional positions are known from practice in which the seat area is folded up and the backrest is folded down after detachment of the pertaining bolting unit. In this case, the backrest is not folded onto the seat area in the pertaining "intermediate position", but almost in a recess in the vehicle floor, in order to achieve a practically continuous transport area overall.

The state of the art has basically proven its worth. However, the known solutions consistently have recourse to two handles. A first handle is generally executed, with the aid of which the bolting unit assigned to the seat area is usually acted upon. As a consequence hereof, the seat area is detached in respect of the motor vehicle chassis or folded down or also pivoted. Furthermore, a second handle is usually provided for, with the aid of which the backrest is detached in respect of the seat area with regard to the pertaining bolting unit. Only then can the desired "folded position" be executed and implemented overall. This is laborious and inconvenient.

SUMMARY OF THE INVENTION

The invention is based on the technical problem of further developing a motor vehicle seat and in particular a motor vehicle rear seat of the configuration described at the start in such a way that operation is simplified and in particular the different functional positions are assumed quickly and conveniently.

In order to solve this technical problem, a class-specific motor vehicle seat and in particular a motor vehicle rear seat within the scope of the invention is characterized in that the only handle is assigned to at least an electrical drive with one or several bolting units of the motor vehicle seat and is thus set up to accomplish all functional positions.

In contrast to the state of the art, only a single handle is used within the scope of the invention. With the aid of this single handle, the motor vehicle seat according to the invention can be transferred into all functional positions. Within the scope of the invention this involves at least the "normal position" and the "folded position". In addition, the only handle can be provided for transferring the motor vehicle seat according to the invention into a further position, such as a "removal position". At minimum, with the invention two different functional positions, namely the "normal position" and the "intermediate position", can be implemented by acting on the single handle which considerably improves operation and convenience compared to the state of the art.

For this purpose, at least an electrical drive is provided for which is assigned to the bolting unit or bolting units. With the aid of the at least one electrical drive, all functional positions can be executed and implemented with recourse to the single handle.

Two electrical drives are generally provided for. These two electrical drives are on the one hand a bolting drive and on the other hand a folding drive. The configuration is such that the bolting drive is provided for acting on the bolting unit assigned to the seat area. With the aid of the bolting drive, the seat area can consequently be pivoted in respect of a floor or the motor vehicle chassis generally. It is also possible that the seat area is completely detached in respect of the motor vehicle chassis. The impingement of the bolting unit assigned to the seat area may also lead to the seat area experiencing a shift as described in US 2017/0197526 A1.

In addition to the previously stated bolting drive, the folding drive is provided for as a second electrical drive. The folding drive is set up to act on the bolting unit assigned to the backrest. In addition, the folding drive can ensure that the bolting unit assigned to the headrest is acted on. This means that with the aid of the folding drive it can be guaranteed on the one hand that the backrest is folded down onto the seat area, for example. The bolting unit assigned to the backrest is detached to this end. The bolting unit may ensure bolting of the backrest in respect of the motor vehicle chassis or also the seat area in this context.

In addition and advantageously, the folding drive ensures that the bolting unit assigned to the headrest is also acted on within the scope of the invention. As a consequence hereof, the headrest is also detached in respect of the backrest with regard to its bolting. The headrest can thus be folded down, for example, in respect of the backrest, and namely in a position as has been described as an example in the class-specific state of the art according to US 2017/0190267 A1. Alternatively it is also conceivable that the headrest is sunk in the backrest. Furthermore, an alternative procedure may be configured in such a way that the headrest slides in respect of the backrest and is completely detached in a gripping manner and can be pulled out of the backrest.

All of these conceivable procedures depend on whether in the "folded position" the motor vehicle seat is transferred into a recess in the motor vehicle floor or not. Furthermore, the invention can also of course be applied to variants which work without a separate or detachable headrest, in which the headrest is almost integrated into the backrest. In any case, the one or two electrical drives ensure that the pertaining bolting unit or the multiple bolting units are acted on accurately and can generally be detached in order to be able to constitute and implement all different functional positions. The one or several electrical drives are acted upon by the single handle. Operation is thus facilitated and convenience improved as the single handle is also used to be able to transfer the relevant motor vehicle seat from its "folded position" to the "normal position" again.

For this purpose, the respective drive works advantageously with interposition of a connector onto the bolting unit. The connector is generally formed as a flexible connector. Bowden cables have proven especially favorable, for example, here. Alternatively to the Bowden cables, for example, simple cable rope pulls or pull rods can be used as flexible connectors. The relevant electrical drive can thus be flexibly placed in or on the motor vehicle seat according to the invention as the mechanical connection occurs from the electrical drive to the bolting unit to be acted on with the aid of the flexible connector.

Furthermore, the invention preferably works with a first sensor to act on the bolting drive. The first sensor is generally triggered upon activation of the handle. A further second sensor is usually provided for controlling of the activation of the folding drive. The second sensor serves to query a seat position or generally the position of the motor vehicle seat according to the invention or the position of the seat area, for example. If the seat area is pivoted after activation of the handle and triggering of the first sensor to detach the bolting unit on the seat area, for example in respect of the motor vehicle chassis, detached wholly from it or assumes a pushed forward position, the change of the position of the seat area can be queried with the aid of this second sensor. As soon as the second sensor is acted on in this way, it ensures that the folding drive is energized. By energization of the folding drive, the bolting unit assigned to the backrest and/or the bolting unit assigned to the headrest is regularly acted on. As a consequence hereof, the backrest can assume its folded down position on the seat area and furthermore the headrest can be folded down or folded in in respect of the backrest.

According to the invention, an additional third sensor can be provided for. With the aid of this third sensor, the attainment of an end position is queried and ascertained. The third sensor can also record the "removal position" where necessary.

It is also possible to have only two sensors and the associated two electric drive. In this case, the bolting drive is still being energized due to triggering of the first sensor the handle, so that the seat can be released from the chassis. Via the second sensor the folding drive can be energized in order to fold the backrest and to fold in the headrest by acting on the associated bolting units. With help of the second sensor the "folded in position" can be queried, wherein in this case the energization of the folding drive is effected directly after triggering of the first sensor and energization of the bolting drive.

One or both electrical drives typically return to their basic position after acting on the pertaining bolting unit. This is at least the case if the additional third sensor ascertains the desired end position of the motor vehicle seat. The pertaining bolting unit can be secured again in this basic position.

A pertaining control unit evaluating the individual signals of the sensors in this context serves advantageously to be able to distinguish between the process for assuming the desired functional position and the return transfer from the desired functional position into the "normal position". If the individual seat elements of the motor vehicle seat according to the invention starting from the "normal position" assume for example their "folded position", this corresponds to the first sensor, then the second sensor and finally the third sensor being acted on, in this order.

The return movement of the seat elements into the "normal position" now leads initially to the third sensor and thereafter the second sensor no longer being acted upon. This is regardless of whether the first sensor is acted on or not. This means that in order to assist the return movement, an operator can easily act on the single handle because the control unit recognizes the return movement from at least the sequence of the impingement of the third and second sensor or their opposite impingement. In contrast, the reverse impingement initially of the second sensor and then the third sensor corresponds to a folding in movement being proceeded with, for example.

As a result, a motor vehicle seat is provided which can be transferred especially conveniently, quickly and intuitively from its "normal position" into a desired functional position. This all succeeds—and also the return transfer—with the aid of a single handle. Operating errors can thus largely be prevented and operation can also be proceeded with special convenience. These are the crucial advantages.

Below, the invention is explained in more detail with reference to drawings showing only two exemplary embodiments, in which:

BRIEF DESCRIPTION OF THE DRAWINGS

FIG. 1), in an "intermediate position" (cf. FIG. 2) and finally in the "folded position" (cf. FIG. 3), FIG. 4 the backrest in an internal view, FIG. 5 a view from below onto the seat area, and FIG. 6 an internal view of a backrest in second exemplary embodiment of the invention.

DETAILED DESCRIPTION

In the figures a motor vehicle seat according to a first exemplary embodiment of the invention is illustrated, which in the embodiment is a motor vehicle rear seat 1. The invention is not restricted to shown motor vehicle seat, and might, for example, be used on a front passenger seat. The motor vehicle rear seat 1 is equipped with at least a seat area 2, a backrest 3 and a headrest 4. In alternative designs, the headrest 4 can also be integrated into the backrest 3. The motor vehicle rear seat 1 can be transferred starting from the "normal position" in FIG. 1 via an "intermediate position" according to FIG. 2 and ultimately into an "folded position" according to FIG. 3.

A bolting unit 5 is assigned to the seat area 2, with the aid of which the seat area 2 can be secured in respect of a motor vehicle floor or generally the motor vehicle chassis K. A further bolting unit 6 is assigned to the backrest 3. With the aid of the bolting unit 6 the backrest is secured in respect of the seat area 2 and/or the motor vehicle chassis K and detachably stated. Finally, a further bolting unit 7 is executed which pertains to the headrest 4 and ensures that the headrest 4 is detachably secured in respect of the backrest 3.

Figure 2:
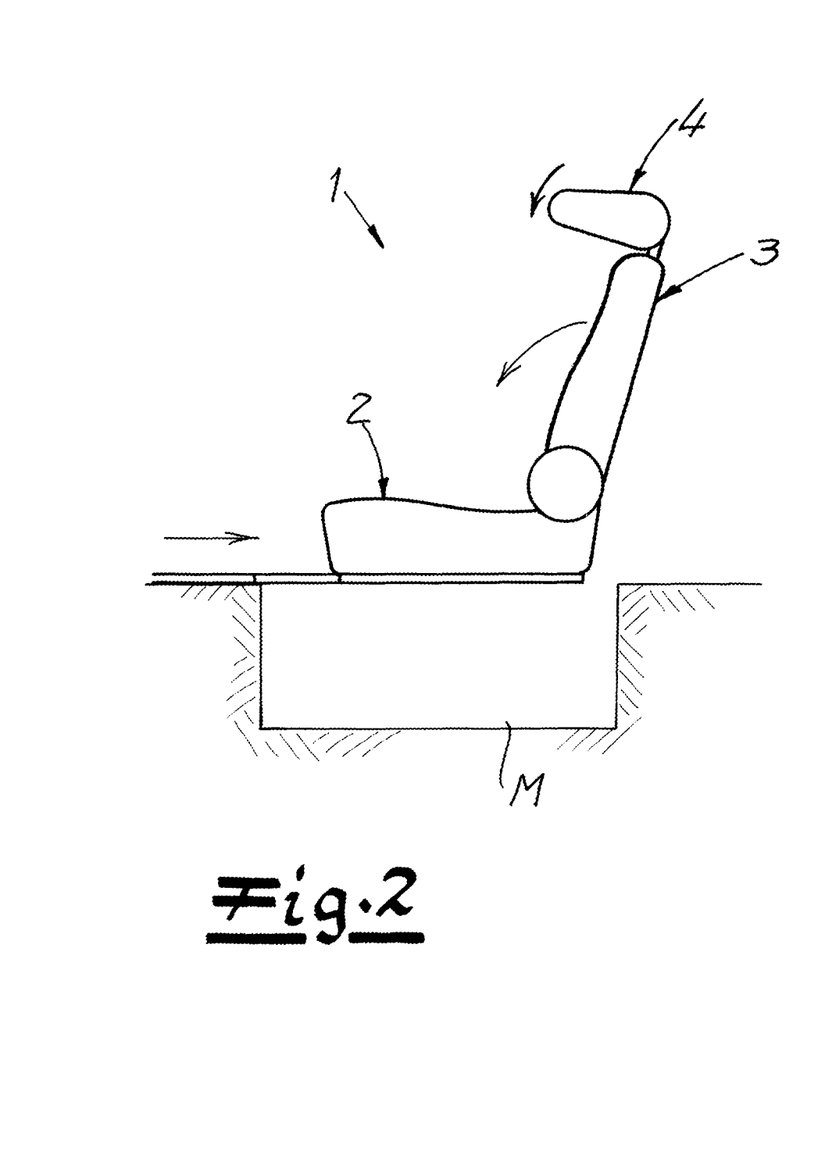
Figure 3:
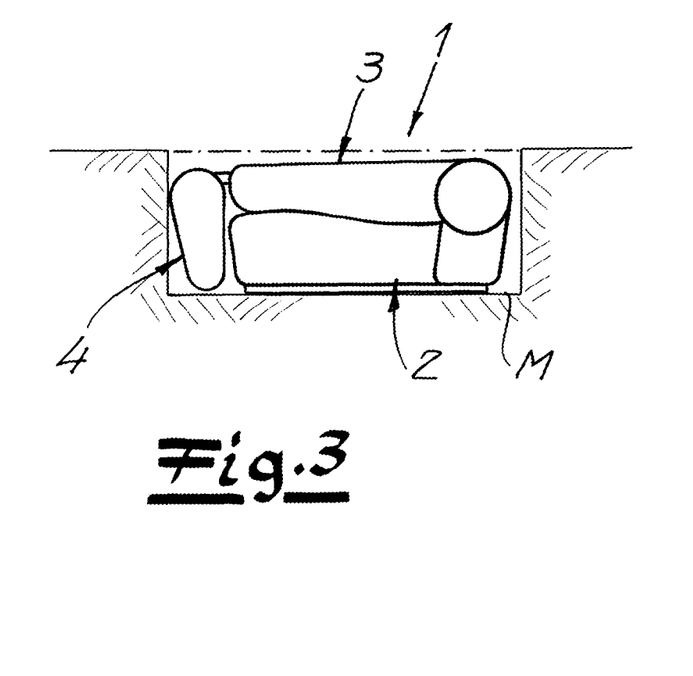
Figure 4:
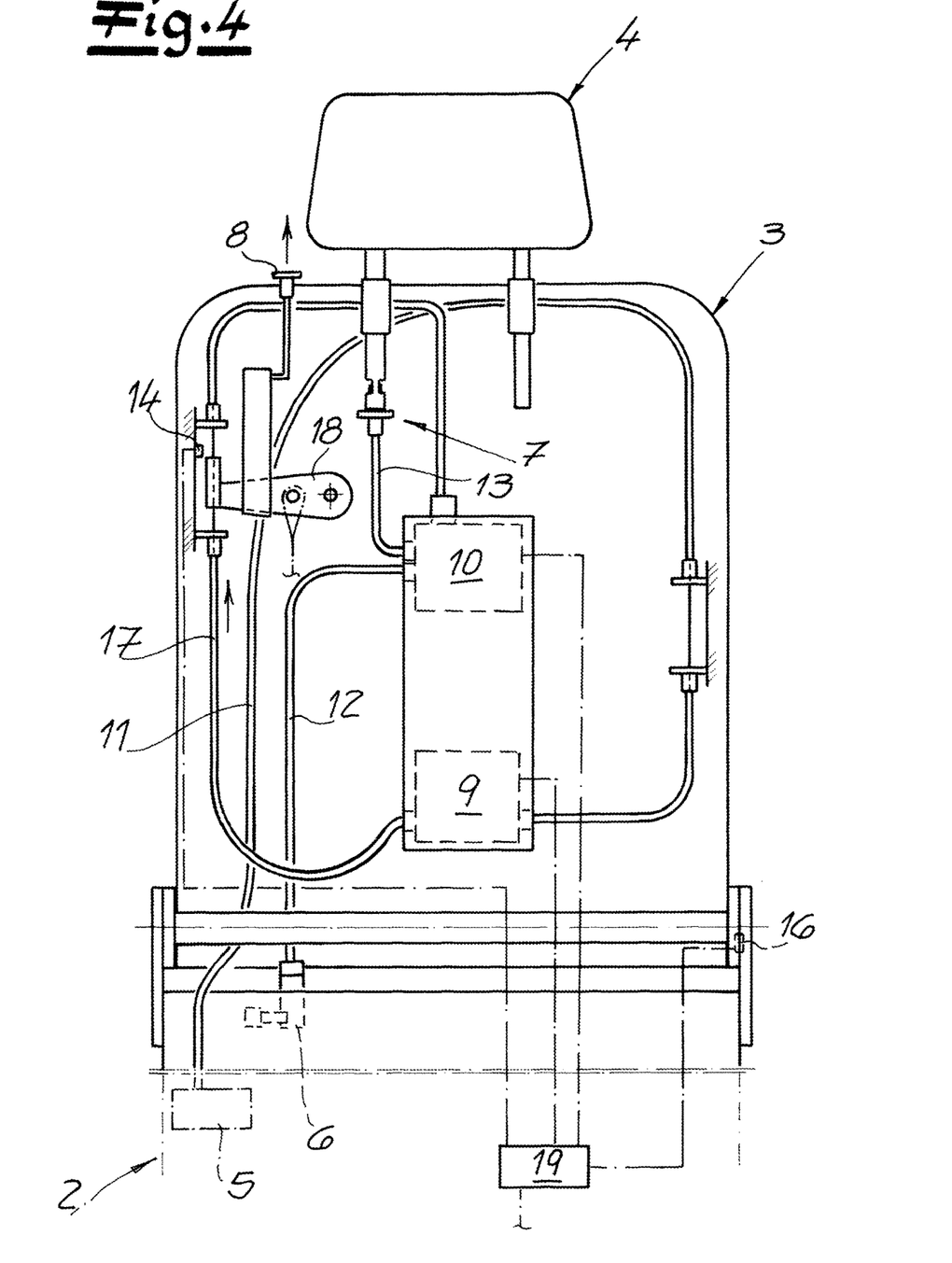
Figure 5:
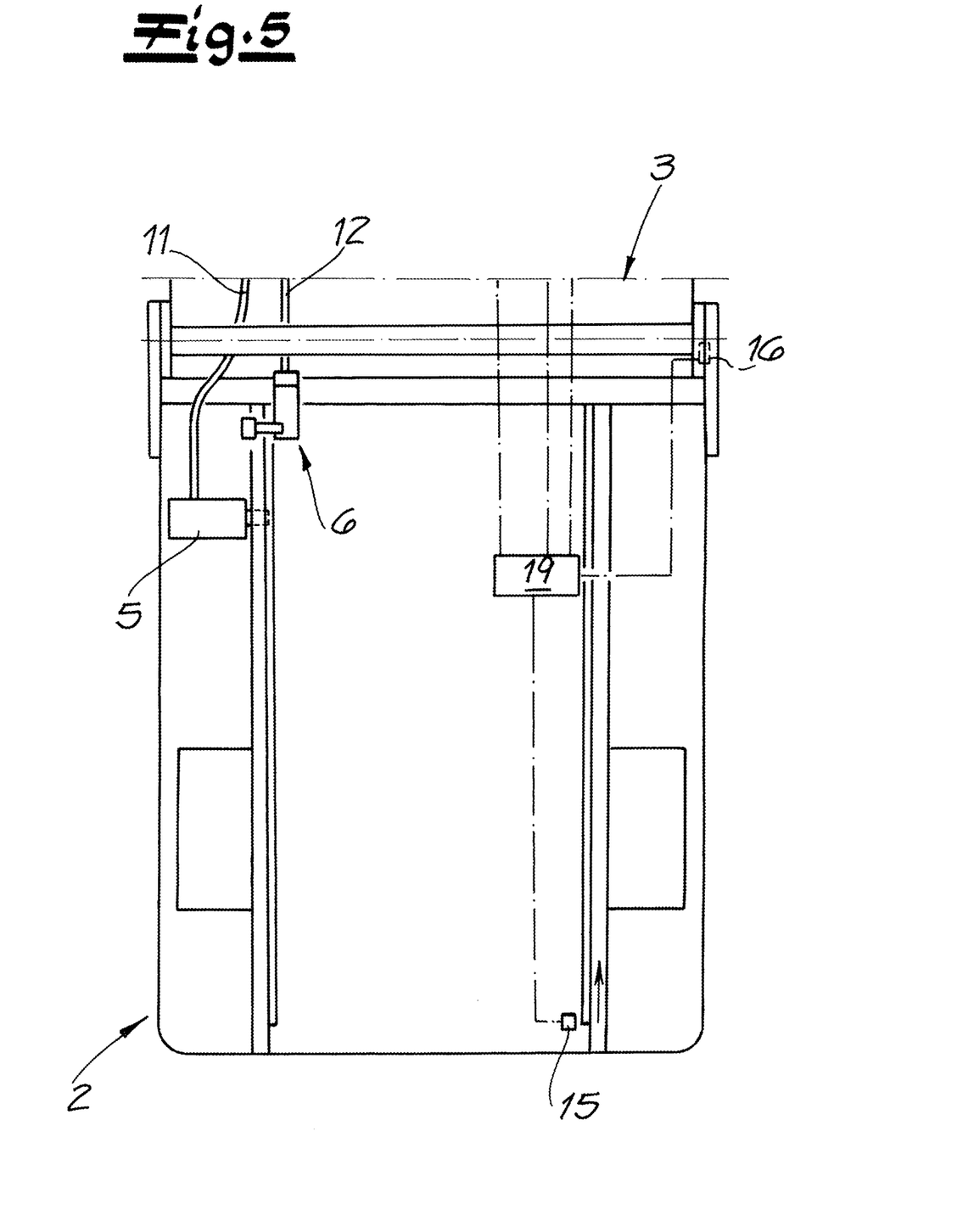

On the basis of the illustration in FIG. 4 a single handle 8 according to the invention is recognized, with the aid of which the individual seat elements 2, 3 4, this means the seat area 2, the backrest 3 and the headrest 4 can be transferred into the previously already described different functional positions "normal position" (shown in FIG. 1), "intermediate position" (shown in FIG. 2) and "folded position" (shown in FIG. 3). This means that no further handle is necessary in addition to a single handle 8. An operator or vehicle user can consequently transfer the motor vehicle seat according to the invention into the stated functional positions with the aid of this single handle 8 and also move back the relevant seat elements 2, 3, 4 into the "normal position" again according to the drawing in FIG. 1.

In order to attain this in detail and implement it according to the invention, the single handle 8 is configured to act on at least one of the electrical drives 9, 10 assigned to the bolting units 5, 6, 7. It can be seen, in particular on the basis of the drawing in FIG. 4, that two electrical drives 9, 10 are executed here. In this embodiment and not restrictedly the electrical drives 9, 10 are incorporated inside the backrest 3. The electrical drives 9, 10 are electrical linear drives 9, 10, with the aid of which mechanical connecting means 11, 12, 13 on the output side are acted on or can be acted on.

The connecting means 11, 12, 13 are flexible connecting elements, specifically Bowden cables in the embodiment. By means of the flexible connecting elements the relevant electrical drives or electrical linear drives 9, 10 are respectively connected to the pertaining bolting units 5, 6, 7. In fact, the electrical drive 9 serves to act on the bolting unit 5 on the seat area 2 by means of the connecting means 11 on the output side, to detach it in the embodiment. With the aid of the second electrical drive 10 the bolting unit 6 of the backrest 3 is detached on the one hand by means of the flexible connector 12. In addition, the second electrical drive 10 works by means of a further flexible connector 13 on the other hand on the bolting unit 7 assigned to the headrest 4 and ensures that the headrest 4 is detached in respect of the backrest 3 with regard to its bolting.

Figure 6:
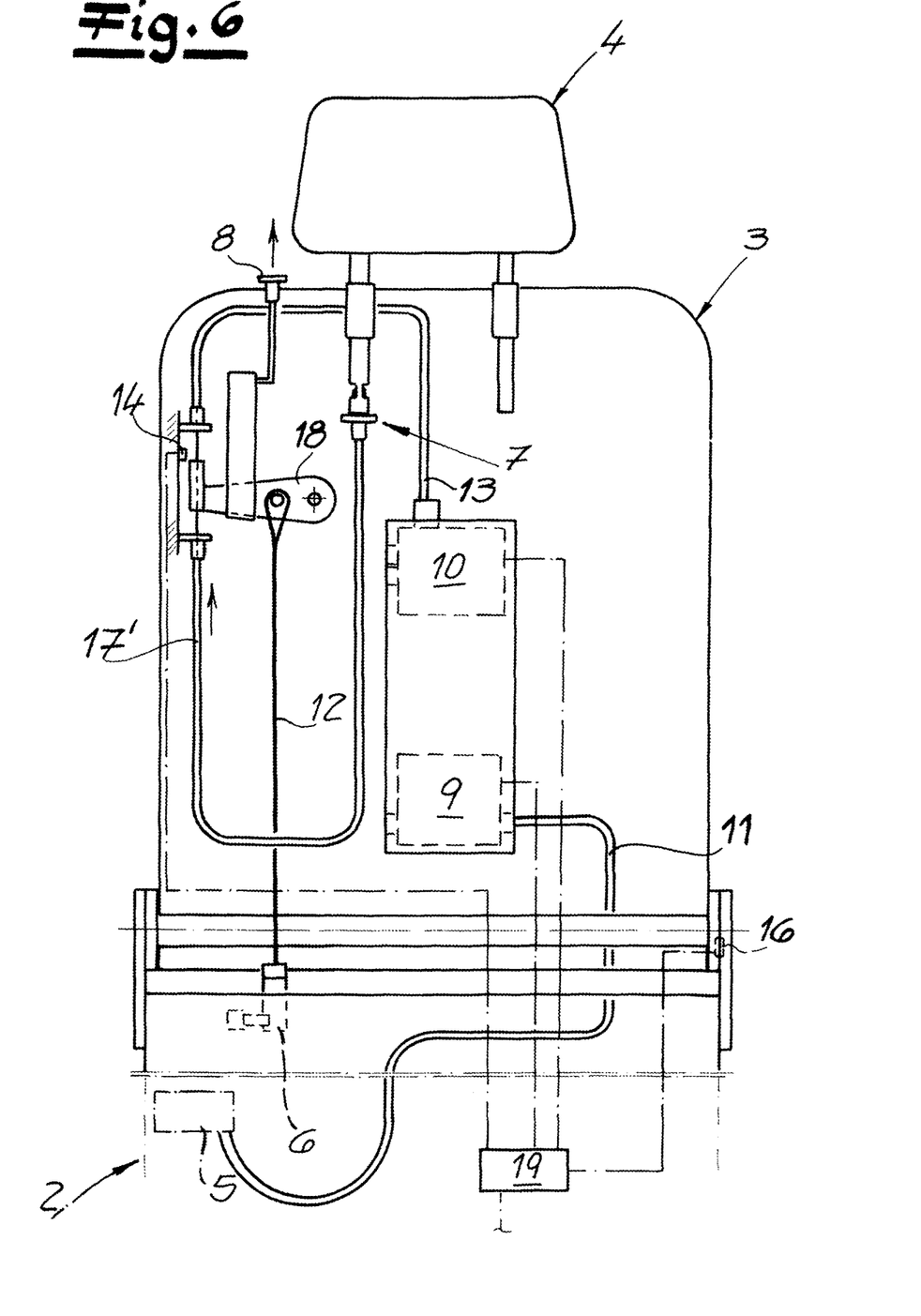

In FIG. 6 a second exemplary embodiment of the invention is shown, in a view similar to FIG. 4. Elements in the second exemplary embodiment of the invention corresponding to elements in first exemplary embodiment are designated by the same reference sign in both embodiments. The second exemplary embodiment functions in substantially the same way as the first exemplary embodiment, with the main difference between the exemplary embodiments being that in the second exemplary embodiment, only two sensors 14, 16 are used. In the following, the description of the second exemplary embodiment centers on the differences. Elements of the second exemplary embodiment not described herein correspond to those of the first exemplary embodiment designated by the same reference number.

In the second exemplary embodiment, the second electric drive 10 is connected to a lever 18 via the connecting means 13, embodied as a flexible connecting element. Lever 18 in turn is connected via a connecting means 12, embodied a stiff connecting means 12 in the form of a rod, to the bolting unit 6 of the backrest 3. A further connecting means 17' connects the lever 18 with the bolting unit 7 of the headrest.

Energization of the electric drive 10 results in common action on the bolting unit 6 and the bolting unit 7 to release them, resulting in transferring of both the backrest 3 and the headrest 4 into the "folded in" position.

As a consequence hereof, the headrest 4 is removed from the backrest 3 or folded down, for example, as illustrated in the "folded position" according to FIG. 3. In fact, in this case the motor vehicle seat is located in the "folded position" inside a recess M which in the embodiment is provided for and set up in the motor vehicle floor to incorporate the motor vehicle seat in the "folded position". Naturally, this is only an example. In other designs, in the "folded position" the motor vehicle rear seat 1 might lie flat on a surface of an motor vehicle interior.

In the present case, the first electrical drive 9 is formed as a bolting drive 9 and serves to act on the bolting unit 5 assigned to the seat area 2. Therefore, as soon as the electrical drive 9 or bolting drive 9 has ensured that the bolting unit 5 is detached, the seat area 2 can be moved, for example, pivoted, shifted or even completely detached in respect of the motor vehicle chassis K.

The second electrical drive 10 is configured as a folding drive 10 in contrast. The folding drive 10 acts on the bolting unit 6 assigned to the backrest 3. As soon as the bolting unit 6 is detached, the backrest 3 can fold down on the seat area 2 as illustrated in FIG. 2, in which the "intermediate position" during transition from the "normal position" to the "folded position" is depicted. Furthermore, the relevant folding drive 10 also acts on the bolting unit 7 pertaining to the headrest 4. Thus, not only can the backrest 3 be folded down onto the seat area 2, but the headrest 4 can also be moved, as shown in FIG. 3 in the transition from the "intermediate position" according to the illustration in FIG. 2 to the "folded position".

In the figures a total of three sensors 14, 15, 16 are illustrated. When acted on, the handle 8 triggers the first sensor 14 in order to start the bolting drive 9 up. As a consequence hereof, the bolting drive 9 ensures by means of the interposed flexible connector 11 that the bolting unit 5 is detached and releases the seat area 2.

The pulling movement on the handle 8 in the arrow direction according to FIGS. 4 and 6 leads to the lever 18 connected to the handle 8 being pivoted in a clockwise direction. The sensor 14 is thus acted on which in turn controls the bolting drive 9 in order to detach the bolting unit 5. The seat area 2 is consequently also detached in respect of the motor vehicle chassis K.

The lever 18 can also be mechanically connected, ultimately to the bolting unit 5, by means of a further connector 17. A further connector illustrated in semi-colons in FIG. 4 may ensure an additional mechanical connection between the lever 18 and the bolting unit 6 for the backrest 3. Thus, both bolting units 5, 6 can also be detached purely mechanically where necessary.

However, the pulling of the single handle 8 illustrated in FIG. 4 leads to the first sensor 14 being acted on. The acting on the first sensor 14 ensures that the bolting drive 9 is acted on which, in turn, detaches the bolting unit 5 by means of the flexible connector 11 on the output side. The seat area 2 is thus detached from the motor vehicle chassis K and can be moved relative to the vehicle chassis K. This movement of the seat area 2 may involve a pivoting or pushing movement. The folding drive 10 is controlled dependent on signals of the sensor 15. The sensor 15 generates a signal when the seat area 2 reaches a pre-determined position during its travel between positions. As soon as the sensor 15 generates this signal the folding drive 10 is activated and via flexible connector 12 connected thereto on the output side the bolting unit 6 for the backrest 3, and also by means of the flexible connector 13 the headrest 4 or the bolting unit 7 there, are being acted on. As a consequence hereof, the respective bolting units 6, 7 are detached and the backrest 3 in the embodiment can be folded in and folded down onto the seat area 2. Furthermore, the headrest 4 can also be folded down. Consequently, after termination of this folding movement overall the "folded position" illustrated in FIG. 3 is attained.

The attainment of the "folded position" is queried with the aid of a third sensor 16 which senses the end position of the backrest 3 when it is lying down on the seat area 2 in the embodiment. All sensors 14, 15, 16 are connected to a control unit 19 overall as depicted in the figures. The control unit 19 can consequently query and evaluate the sensor 14, 15, 16 activation sequence.

Figure 1:
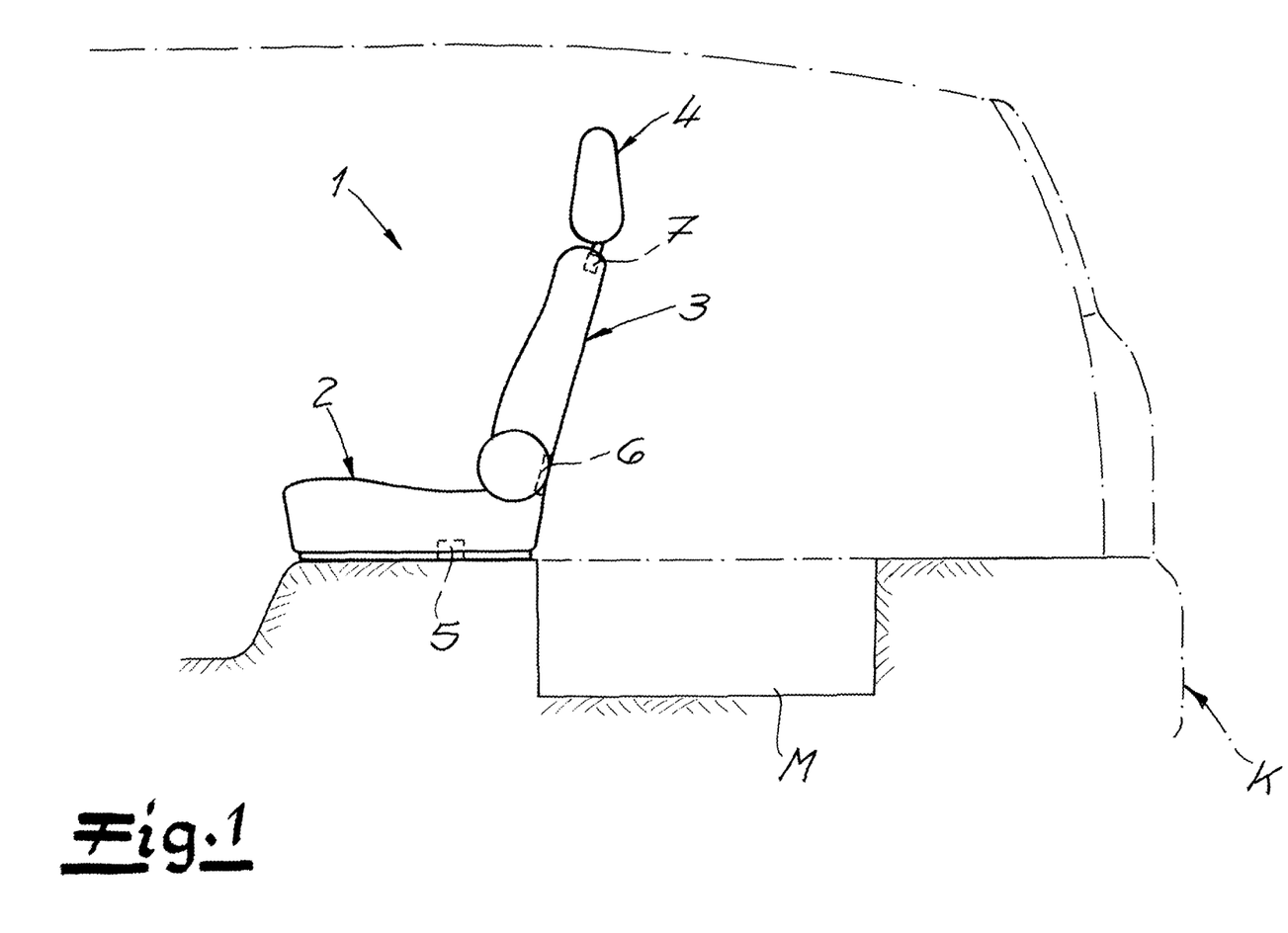
FIGS. 1 to 3 the motor vehicle seat according to a first exemplary embodiment of the invention in the "normal position" (cf.

If the control unit 19 ascertains that the first sensor 14, then the second sensor 15 and finally the third sensor 16 are acted on in this sequence, this pertains to the motor vehicle seat or motor vehicle rear seat 1 according to the invention being transferred from its "normal position" illustrated in FIG. 1 overall into the "folded position" illustrated in FIG. 3. Vice versa, a sequence of the third sensor 16 and then the second sensor 15 being acted on corresponds to the motor vehicle rear seat 1 being returned from its "folded position" illustrated in FIG. 3 into the "normal position" according to FIG. 1. Hereby it explicitly does not matter whether the first sensor 14 is additionally acted on or not. Thus, in this process the handle 8 can be reached by an operator and be used for the return of the motor vehicle rear seat 1 into the "normal position".

As already described above, both drives 9, 10 ensure that the bolting units 5, 6, 7 are detached. After relevant impingement, the drives 9, 10 return to their starting position. The respective bolting unit 5, 6, 7 is then mechanically closed (again) or secured on the return of the pertaining seat elements 2, 3, 4 from the "folded position" to the "normal position".

The invention claimed is:

1. A motor vehicle seat comprising:
   a plurality of seat elements comprising at least a seat area and a backrest;
   a first unlockable bolting unit corresponding to the seat area and a second bolting unit corresponding to the backrest;
   a single handle for acting on the bolting units, whereby the seat elements can assume different functional positions; and
   at least two electrical drives that correspond to the first and second bolting units, wherein the single handle is configured to act on the two electrical drives to execute all functional positions.

2. The motor vehicle seat of claim 1, wherein the two electrical drives include a bolting drive and a folding drive.

3. The motor vehicle seat of claim 2, wherein the bolting drive is configured to act on the bolting unit corresponding to the seat area.

4. The motor vehicle seat of claim 2, wherein the folding drive is configured to act on the bolting unit corresponding to the backrest.

5. The motor vehicle seat of claim 4 further comprising a headrest, wherein the folding drive additionally acts on the bolting unit corresponding to the headrest.

6. The motor vehicle seat of 2 further comprising a connector arranged between each of the electrical drives and the corresponding bolting unit.

7. The motor vehicle seat of claim 6, wherein the connector is formed as a flexible connector.

8. The motor vehicle seat of claim 2, wherein the handle, during activation, triggers a first sensor to act on the bolting drive.

9. The motor vehicle seat of claim 8 further comprising a second sensor to act on the folding drive.

10. The motor vehicle seat of claim 9 further comprising a third sensor which records an attainment of an end position.

11. The motor vehicle seat of claim 3, wherein the folding drive is configured to act on the bolting unit corresponding to the backrest.

12. The motor vehicle seat of claim 7, wherein the flexible connector is a Bowden cable.

13. The motor vehicle seat of claim 1, wherein the seat elements are movable between a normal position and a folded position.

14. The motor vehicle seat of claim 13, wherein the seat elements are movable to an intermediate position that is between the normal position and the folded position.

15. The motor vehicle seat of claim 1, wherein the motor vehicle seat is a rear seat.

* * * * *